Dec. 20, 1955  W. J. WITWER  2,727,346
VARIABLE TENSION HITCH FOR AGRICULTURAL IMPLEMENT
Filed Nov. 13, 1952
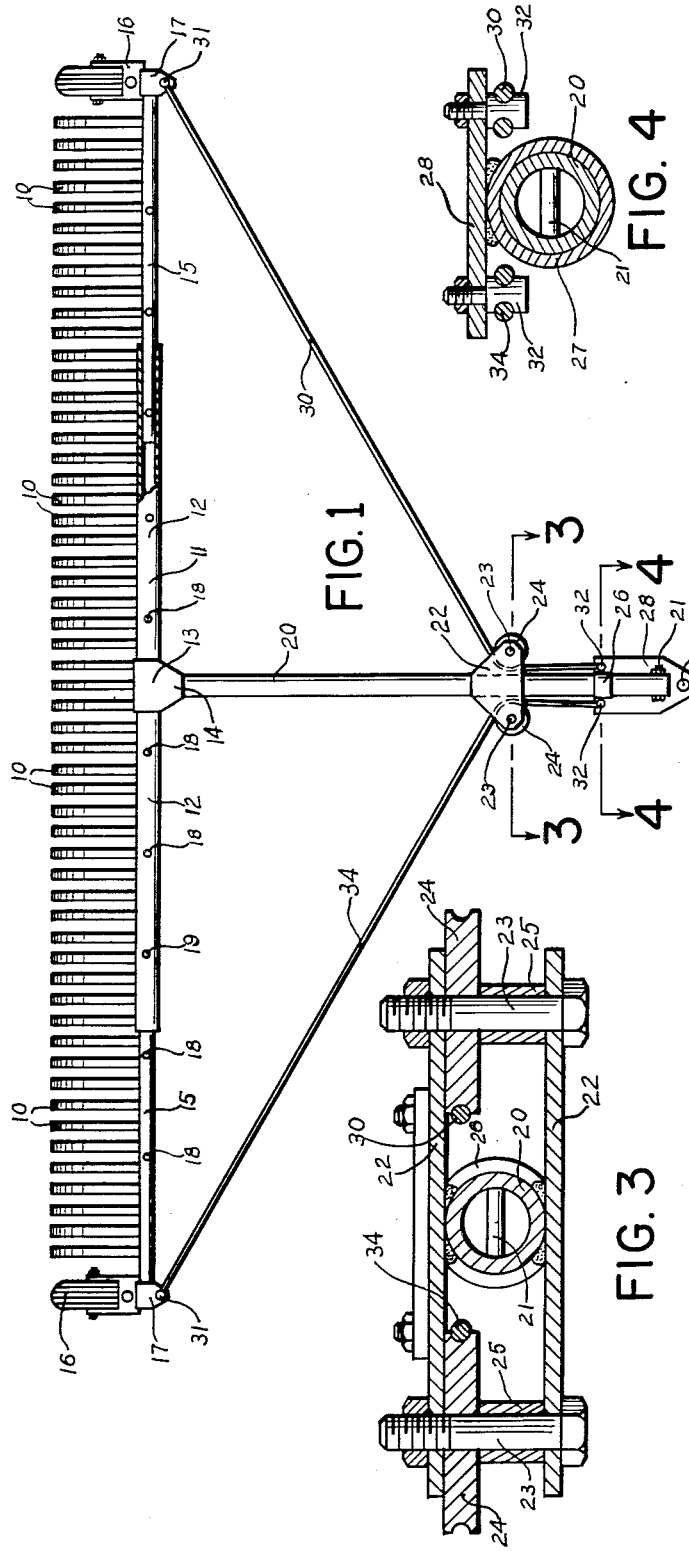
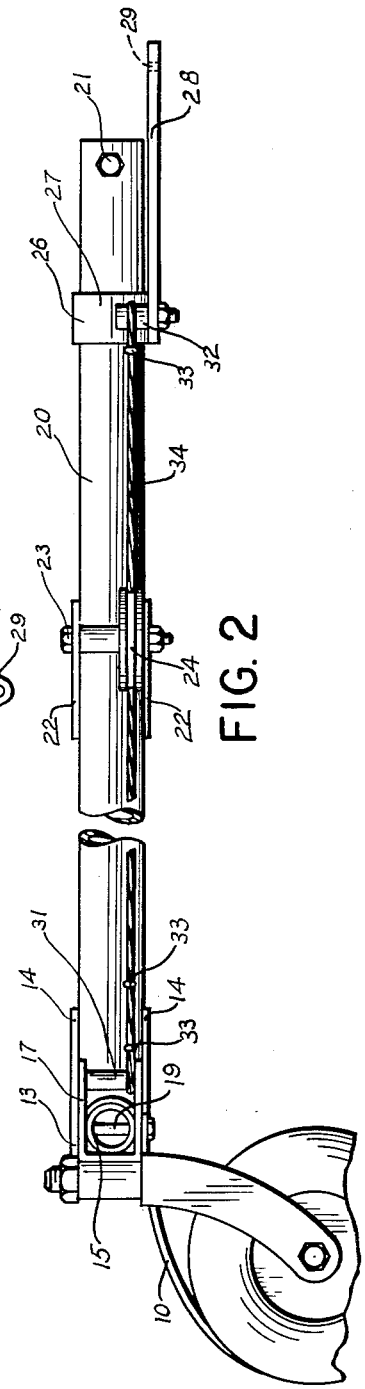
INVENTOR.
WALLACE J. WITWER
BY
ATTORNEYS

United States Patent Office 2,727,346
Patented Dec. 20, 1955

2,727,346

VARIABLE TENSION HITCH FOR AGRICULTURAL IMPLEMENT

Wallace J. Witwer, Galion, Ohio, assignor to The Cobey Corporation, Galion, Ohio, a corporation of Ohio Application November 13, 1952, Serial No. 320,167

8 Claims. (Cl. 55—19)

This invention relates to the draft tongue or hitching bar of drawn agricultural implements, and more particularly, to a hitching bar which is particularly adapted for use in connection with agricultural implements having a wide working swath or area.

In agriculture it is customary to utilize soil-treating or turning implements which, for example, may be disk harrows or field cultivators or mulcher wheels, in which the earth-contacting tool, such as the harrow, for example, is suitably mounted on a wheeled frame which is adapted to be drawn by a prime mover, such as a tractor, over the field which is to be cultivated or otherwise treated.

In an effort to reduce the number of hours involved in soil cultivating labor, the effective width of such soil turning agricultural instruments is being progressively increased so that a greater area of soil can be treated with a single pass or sweep of the implement. The increased width of these implements has posed problems in their construction. The lever arms, created by the extreme ends of the implement, have created tension or stress conditions during the operation of the implement which have to be compensated for in its design. The immediate and obvious solution to this problem was to suitably reinforce and brace the structure of the implement to give it rigidity and strength to withstand the stresses which occurred during operation. However, this solution to the problem has certain disadvantages which consist of imparting to the implement an unreasonable degree of rigidity, whereas a certain degree of flexibility is required. Further, the necessary bracing and reinforcing members add weight to the implement which makes it more difficult to draw and makes it likewise difficult to transport from one work area to another. Extensive bracing and reinforcing also has a substantial effect on the cost of manufacture of the implement.

It is a primary object of my invention to provide an agricultural implement of the character described which will have the advantage of flexibility or resiliency, while at the same time, having means for compensating for the stresses which occur during the operation of the agricultural implement.

Another object of my invention is to provide a draft tongue or connecting hitch for such an agricultural implement which will be so constructed as to vary the tension or pull on the implement in response to obstacles which are in the ground and engage the implement to impede its forward progress.

Still another object of my invention is to provide a device of the character described in which the connecting means is floating so that it can yield to conditions of increased stress which might occur in the operation of an agricultural implement drawn by a prime mover.

Other objects and advantages of my invention will be apparent during the course of the following description.

In the accompanying drawings forming a part of this specification and in which like numerals are employed to designate like parts throughout the same, Fig. 1 is a top plan view of an agricultural implement embodying features of my invention;

Fig. 2 is an enlarged fragmentary side elevation of the implement shown in Fig. 1;

Fig. 3 is a cross sectional view taken as indicated by line 3—3 of Fig. 1, and

Fig. 4 is an inverted cross sectional view taken as indicated by line 4—4 of Fig. 1.

Referring more particularly to the drawings, it will be seen that the agricultural implement shown in Fig. 1 is in the form of a spring tooth field cultivator. A plurality of curved spring teeth 10 are suitably mounted on the frame of the cultivator which is designated by the numeral 11. The frame includes a cylindrical tubular member 12 which extends through a U-shaped connecting element 13 which embraces the member and has laterally extending ears 14.

In each end of the member 12 is telescopically received another tubular member 15, which has mounted on the free ends thereof a caster wheel 16, which is secured to the member 15 by means of a bracket 17.

It will be understood that a fixed number of teeth 10 are mounted on the member 12. The number of teeth mounted on the members 15 will depend upon the extent to which it is desired to telescope the members 15 within the member 12. When a great width of working area is desired, the members 15 are extended to their maximum width. However, when it is desired to work a lesser area, a selected number of the teeth 10 can be removed from each of the members 15 to permit a suitable degree of telescoping of the members 15 within the member 12.

Both the member 12 and the members 15 are provided with apertures 18 at suitable intervals along their length. A fastening element such as a bolt 19 can be used to traverse the apertures and hold the members 15 and 12 in a selected relationship.

The connecting element 13, which is rigidly secured to the member 12 as by welding, has fixedly secured thereto, intermediate the ears 14 thereof, a longitudinally extending tubular drawbar or tongue 20. As best seen in Fig. 4, the end of the drawbar 20 is provided with a stop or abutment which may be in the form of a bolt 21 which traverses the drawbar 20.

Rigidly secured to the drawbar 20, intermediate the ends thereof, are two vertically spaced plates 22, one of which is welded to the upper side of the tongue 20, and the other of which is welded to the underside of the element 20. Two horizontally spaced spindle bolts 23 extend through the plates 22, one of the bolts 23 being on one side of the drawbar 20, and the other of the bolts 23 being on the other side of the drawbar 20. On each of the spindle bolts 23 is rotatably mounted a pulley 24, which is so positioned as to lie intermediate the plates 22. Suitable bushings 25 may be utilized to maintain the pulleys in position.

A saddle member 26 is slidably mounted on the drawbar 20 so as to be freely movable intermediate the stop 21 on the end of the drawbar and the plates 22. The saddle includes a tubular portion 27, which is traversed by the drawbar 20, and a flat plate 28 which is fixedly secured to the tubular portion 27, and which extends laterally therefrom on the under side of the drawbar 20. The plate 28 is provided with an opening 29 for a purpose to be described.

A length of wire cable 30 is trained over one of the pulleys 24. One end of the cable 30 is anchored to a pin 31, which is secured in the bracket 17 on which the swivel wheel 16 is mounted. The other end of the cable 30 is anchored to a pin 32 which is provided on the plate 28 of the saddle 26. Cable clamps 33 are provided at each end of the cable 30 to secure the ends of the cable in position.

A similar cable 34 is also trained over the other pulley 24, and likewise secured to pins 31 and 32 at the ends thereof.

It will be observed that if the pull of the prime mover were directly on the drawbar 20, the tension would be directed at the center of the frame 11 and, due to the length of the members 12 and 15, a whipping action might occur at the ends of the frame. For example, if a rock should engage one of the spring teeth which is near one of the wheels 16, it would retard the movement of the implement, and perhaps deform the frame 11 due to the fact that one side of the implement would be free to move forward whereas the other side of the implement would be retarded. By utilizing the principles of my invention, I am able to distribute the stresses when the implement is pulled, and equalize these stresses so that no deformation will occur, while at the same time, maintaining a reasonably structurally sound design.

The operation of the agricultural implement will be described. A prime mover, such as a tractor, is connected to the plate 28 of the saddle 26, in any conventional manner. This may be accomplished by inserting a suitable connecting pin, not shown, in the opening 29 of the plate 28 so that it will form a link between the prime mover and the saddle 26. Inasmuch as the saddle 26 is slidably mounted on the drawbar 20, the forward movement of the tractor exerts a pull, not directly on the drawbar, but instead, on the saddle 26. This pull is transmitted through the cables 30 and 34 to the frame of the implement. However, due to the fact that the pulleys 24 are secured to the plates 22, which in turn are rigidly secured to the drawbar 20, a certain portion of the pull will be directed through the drawbar 20 to the center of the frame 11. It will thus be apparent that the stresses on the frame are now at three spaced points instead of being merely at the central point where the drawbar 20 connects to the frame members 12 and 15.

If, during the course of its travel, the field cultivator should hit an impediment in the form of a rock or other obstacle, the variable tension characteristics of the hitch will come into play. If the obstacle is on that side of the implement which is tensioned by the cable 30, the cable 30 will be placed under an increased tension due to the bowing out effect which is produced on the frame members 12 and 15. This increased tension of the cable 30 will cause the saddle member 26 to move rearwardly of the drawbar 20, that is, towards the plates 22. When this rearward movement of the saddle 26 occurs, there is a momentary slackening of the cable 34. This momentary slackening of the cable 34, permits a greater amount of pull to be exerted, through cable 30, on that portion of the frame which is being retarded by the obstacle. The pull of the prime mover is therefore directed primarily toward the side of the implement which is under tension of the cable 30, instead of being directed equally to the two ends of the implement and the drawbar connection at plate 13. As soon as the increased tension on the cable 30 has caused the implement to overcome obstacle, the saddle 26 will revert to a normal position and the tension on the cables 30 and 34 will be equalized. It is to be noted that during the time that the cable 30 is under increased tension, that the portion of the implement frame which is normally under tension by the cable 34, is not put under such tension, due to the slackening of cable 34. This prevents any deformations of the implement frame 11. It will, of course, be understood that should the obstacle or impediment be encountered on the side of the implement which is under tension by the cable 34, that the same sequence will occur, that is that the cable 34 will be put under increased tension and the cable 30 will be slackened.

Not only does the floating saddle connection and the use of the flexible cables permit variable tension to be applied to the frame of the implement, as above described, but the flexible cable construction also permits the gang width of the spring teeth to be varied by telescoping the members 15 within the member 12 as previously indicated. When an adjustment is made in the width of the implement, the length of the cables 30 and 34 can be correspondingly adjusted by releasing the cable clamps 33 and either shortening or lengthening the effective length of the cable prior to again securing the cable by means of the clamps.

From the foregoing description it will be apparent that I have provided a form of variable tension hitch which will uniformly distribute the pulling tension of the prime mover to the drawn implement during normal operation thereof. However, when the implement encounters an obstacle, the tension of the prime mover is concentrated on that portion of the implement whose progress is impeded. Further, it will be noted that the construction herein disclosed provides means for varying the gang width of the implement with corresponding adjustments in the tensioned cables.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. In a drawn agricultural implement having a tool-supporting frame and a longitudinal drawbar secured to said frame, the combination of a coupling element slidably secured to said drawbar, a pair of flexible connectors, each one of said connectors having one end thereof secured to said frame and having the other end thereof secured to said coupling element to transmit tension directly to said frame from said coupling element, and means fixedly secured to the drawbar and slidably engaged by each of said connectors to transmit tension to said drawbar.

2. In a drawn agricultural implement, the combination of a longitudinally extending drawbar, a tool-supporting frame secured to said drawbar transversely thereof, a coupling element slidably mounted on said drawbar, a pair of flexible connectors operatively connecting said coupling element and said frame to transmit tension from said coupling element to said frame, and connector retaining means secured to said drawbar intermediate said frame and said coupling element and slidably engaged by said connector to transmit tension to said drawbar.

3. In a drawn agricultural implement, the combination of a transverse tool-supporting member, a drawbar secured to said member and extending longitudinally medianly therefrom, a coupling element slidably mounted on said drawbar, a flexible connector secured to said coupling element and having portions thereof extending from opposite sides of said drawbar into securement with said member to transmit draft from said coupling element to said member, and connector retaining means secured to said drawbar intermediate said member and said coupling element and slidably traversed by said connector to transmit draft to said drawbar.

4. A combination as defined in claim 3, wherein said flexible connector is secured to said member at the ends of said member, in equidistant relationship to said coupling element.

5. A combination as defined in claim 3, wherein said connector retaining means comprises a pair of rotatable elements secured to said drawbar on opposite sides thereof, and said flexible connector is trained over said rotatable elements.

6. A combination as defined in claim 3, wherein said tool-supporting member is supported by ground-engaging wheels secured thereto.

7. In a drawn agricultural implement, the combination of a primary transverse tubular tool-supporting member, secondary tool-supporting members slidably engaging opposite ends of said primary tool-supporting member in axial alignment therewith, means for adjustably securing said secondary members in fixed relationship to said primary member, a longitudinal drawbar extending medianly from said primary member and fixedly secured thereto, a coupling element slidably mounted on said drawbar, a flexible connector secured to said coupling element and secured to the ends of each of said secondary tool-supporting members to transmit draft from said coupling element to said members, releasable clamping means on said flexible connector securing the free ends thereof, whereby the effective length of said connector may be selectively adjusted to conform to adjustments made between said primary and secondary tool-supporting members, and connector retaining means secured to said drawbar intermediate said coupling element and said tool-supporting members and slidably traversed by said connector to transmit draft to said drawbar.

8. A combination as defined in claim 7 wherein said flexible connector is a wire cable.

References Cited in the file of this patent

UNITED STATES PATENTS

| | | |
|---|---|---|
| 1,447,539 | Fultz | Mar. 6, 1923 |
| 1,813,500 | Lenhart et al. | July 7, 1931 |
| 1,858,878 | Byron | May 17, 1932 |
| 2,559,002 | Brock | July 3, 1951 |